US012468333B2

(12) United States Patent
Lintz et al.

(10) Patent No.: US 12,468,333 B2
(45) Date of Patent: Nov. 11, 2025

(54) DISTRIBUTED IN-MEMORY TIMER QUEUES

(71) Applicant: Twilio Inc., San Francisco, CA (US)

(72) Inventors: Christopher Lintz, Franktown, CO (US); Fawad Halim, Addison, IL (US); Krishna Tushar Dharaiya, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 137 days.

(21) Appl. No.: 18/400,742

(22) Filed: Dec. 29, 2023

(65) Prior Publication Data

US 2025/0216890 A1    Jul. 3, 2025

(51) Int. Cl.
*G06F 1/10* (2006.01)

(52) U.S. Cl.
CPC ..................... *G06F 1/10* (2013.01)

(58) Field of Classification Search
CPC ....................................................... G06F 1/10
See application file for complete search history.

(56) References Cited

U.S. PATENT DOCUMENTS

| | | | | |
|---|---|---|---|---|
| 11,474,707 B2 * | 10/2022 | Carson | ................. | G06F 3/0619 |
| 11,977,513 B2 * | 5/2024 | Jiang | ..................... | G06F 16/183 |
| 12,032,995 B1 * | 7/2024 | Kliot | ..................... | G06F 9/4881 |
| 2020/0193358 A1 * | 6/2020 | Vick | ........................ | G06F 3/017 |
| 2020/0348968 A1 * | 11/2020 | Huchachar | .............. | G06F 9/445 |
| 2023/0100931 A1 * | 3/2023 | Lifshitz | .................... | G06F 3/067 |
| | | | | 709/206 |
| 2023/0327875 A1 * | 10/2023 | Tsai | .................... | G06F 16/1734 |
| | | | | 726/9 |

\* cited by examiner

*Primary Examiner* — Phil K Nguyen
(74) *Attorney, Agent, or Firm* — Schwegman Lundberg & Woessner, P.A.

(57) ABSTRACT

Disclosed are systems and methods for implementing distributed in-memory timer queues. A plurality of queues is distributed across a plurality of nodes. The plurality of queues includes a first queue. The first queue corresponds to current timer expirations for a tenant, time bucket, and shard. A sorted set includes minute references to unacknowledged timers for a tenant and shard. A plurality of processes is created. Each of the plurality of processes is configured to be a unique consumer of the distributed plurality of queues. A first consumer group and a second consumer group are created within each of the plurality of processes. The first consumer group corresponds to the first queue. The second consumer group corresponds to the sorted set. The plurality of processes is used to proportionally consume the first queue with the first consumer group and the sorted set with the second consumer group.

20 Claims, 14 Drawing Sheets

| SYSTEM LEVEL 502 | |
|---|---|
| TYPE | METRIC |
| POD | CPU USAGE |
| POD | MEMORY USAGE |
| POD | GARBAGE COLLECTION METRICS |

| APPLICATION LEVEL 504 | |
|---|---|
| SERVICE | METRIC |
| TIMER PUBLISHER | WRITE SUCCESS |
| TIMER PUBLISHER | WRITE FAILS |
| TIMER PUBLISHER | WRITE LATENCY ON CREATE |
| TIMER CONSUMER | SEND DRIFT ( CLOCK -> EXPIRESAT) |
| TIMER CONSUMER | FAILED SENDS |
| TIMER CONSUMER | SUCCESSFUL SENDS |
| TIMER CONSUMER | CONSUMPTION RATE (READS/SEC) |
| TIMER CONSUMER | SEND DESTINATION LATENCY |
| TIMER CONSUMER | TOTAL TIMERS IN A MINUTE |

FIG. 5

DISTRIBUTED IN-MEMORY TIMER QUEUES

TECHNICAL FIELD

The subject matter disclosed herein generally relates to methods, systems, and machine-readable storage media for implementing distributed in-memory timer queues for timers as a service (TaaS) and, in one specific embodiment, to using unique consumers of distributed queues where the key name consists of a current sharded time bucket (e.g., minute) of timer expirations to process expiring timers even when multiple unique consumers suffer outages.

BACKGROUND

As a user goes through different conceptual stages when interacting with a brand or product, a marketer may introduce one or more wait conditions (e.g., timer delays) within a marketing journey system. The unique user wait condition will cause a pause in the transition to a subsequent stage until the desired time has elapsed. It can be challenging to achieve low latency and high scale with existing techniques for storing and processing unique per user timers. Current techniques for timers at scale can cause large amounts of network requests and require high amounts of storage IOPs.

BRIEF DESCRIPTION OF THE DRAWINGS

The appended drawings merely illustrate example embodiments of the present disclosure and cannot be considered to be limiting its scope.

FIG. 5 are tables showing system-level metrics and application-level metrics 504 available in time series form with appropriate percentiles.

DETAILED DESCRIPTION

Figure 1A:
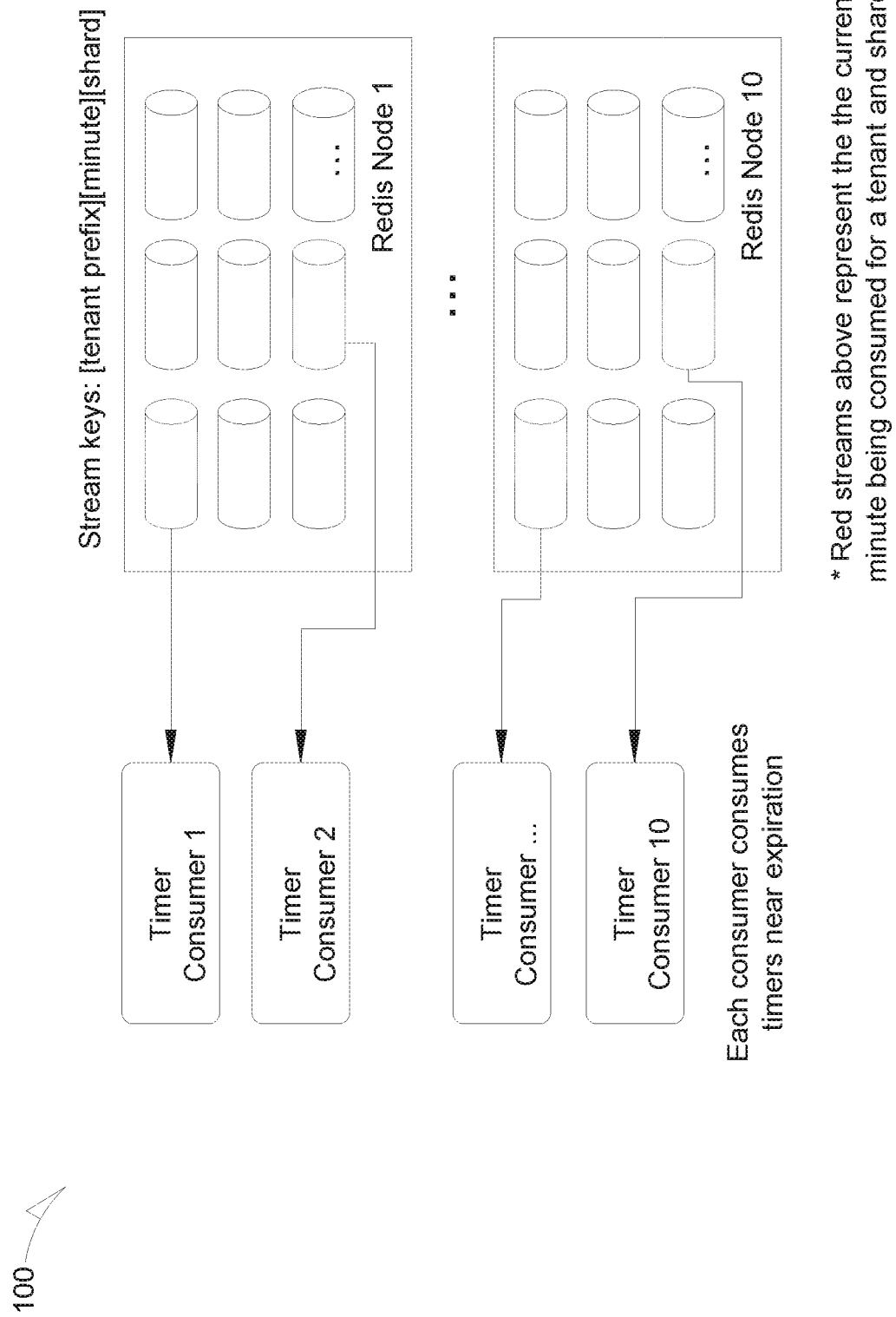
FIG. 1A is a block diagram depicting an example technique for implementing timers using in-memory distributed queues.

Example methods, systems, and computer programs are directed to a wait condition primitive that is able to be used in a distributed timer service that supports multi-tenancy. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. However, it will be evident to one skilled in the art that the present subject matter may be practiced without these specific details.

In example embodiments, timers can be created and scheduled and they can be used as soon as they are created, even as far out as a month or years later. However, having a large number of timers expiring in the hundreds of thousands to millions in a second could result in chatty network traffic and large latencies. Being able to deal with a large number of timers or trying to handle stateful timers can be complex, especially when trying to deal with a pattern of distributed timers that are handling billions of active timers or millions of timers that are fired and consumed at a peak second. Current solutions are programmatically complex and error-prone.

Methods, systems, and computer programs are presented for creating a timer service (also referred to herein as Timers as a Service). In example embodiments the timer service is a distributed service, as described herein. In example embodiments, the timer service supports multi-tenancy, as described herein. In example embodiments, a tenant includes a client of the timer system, such as a journey state management system, a single send system (including send time optimizations for a single send system), or a compute system. In example embodiments, a wait condition primitive is used. In example embodiments, the wait condition primitive includes a scheduled timer that fires as soon as now and as far out as many months or years. In example embodiments, the single send system is a one-time email message delivered to a list or partition of an audience that is not part of a series of related messages that are designed to work in sequence. For example, single sends can be used to deliver promotional offers, engagement campaigns, newsletters, announcements, legal notices, policy updates, and more.

In example embodiments, the timer service supports at-least once delivery, but minimizes duplicate sends during failure scenarios. In example embodiments, the timer service does not persist local state on its nodes. In example embodiments, the timer service is fault tolerant of Availability Zone (AZ) failures. In example embodiments, the timer service supports create, read, update, and delete (CRUD) operations for creating tenants and/or timers. In example embodiments, the timer service supports per time bucket interval (e.g., per-minute) precision timers. In example embodiments, the timer service implements timers that cannot fire early. In example embodiments, the timer service supports recoverability of timers that were in-memory when a node crashed.

In example embodiments, the architecture of the timer service includes a data model that allows for consuming timers near expiration and/or pre-positioning the timers in memory. Reading hundreds of thousands of timers per second may be more efficient if the scheduling (e.g., scanning expiresAt) are partitioned together over a shared time interval. For example, a sharded minute may be calculated as unix timestamp/60. Reads and writes of timers expiring near the same time are extremely efficient because batch reads/writes occur in-memory on the same physical node.

A durable in-memory database service that delivers fast performance (e.g., MemoryDB) may be used to achieve a desired scale and/or performance (e.g., a scale that transgresses a configurable scale threshold and/or a performance that transgresses a configurable performance threshold). The in-memory database may provide multi-AZ durability. A data structure that functions as an append-only log (e.g., a queue or a stream, such as a Redis stream) may be utilized (e.g., for consumer group functionality and/or reliable timer sends). Therefore, the system can support a large number of read and/or write requests per second and can provide a high write throughput per node.

In example embodiments, the architecture of the timer service is designed for a large number of reads and/or writes.

In example embodiments, by grouping timers by sharded timer expiration time bucket interval (e.g., minute) per tenant (e.g., key contains [tenant prefix][minute][shard]), the timer service achieves efficient read/write rates for any given time bucket interval (e.g., minute). In example embodiments, when queues for the data structure that functions as the append-only log only reside on a single node, a stream or queue key name convention allows the timer service to evenly distribute the queues across a cluster. In example embodiments, the timers are added as elements on the queue and contain sId, payload, expiresAt, and/or a field for one or more Ids.

The following is an explanation for a large burst scenario to explain how the timers scale. Imagine 1M timers are created and set to expire at exactly the same time (e.g., or within the same time bucket interval, such as within the same minute). This could be in aggregate across one or more tenants (e.g., journeys or "single send" use cases on big holiday moments (e.g., New Year's Eve) or during the Super Bowl. In example embodiments, "journeys" refers to customer journey management tools that allow, for example, marketers to build sophisticated customer journeys and orchestrate personalization at scale, through multiple channels, and across an entire customer experience stack. A customer journey may be thought of an entire experience a customer has while interacting with a brand, over time, and across channels.

For simplicity, let's assume a key shard of size 10, where the 1M timers will be evenly distributed into 10 queues across the cluster. If the system is configured to support a sustained 1M writes/sec, using in-memory database writes/sec of 50K per node, this would require at least 20 nodes. In practicality there may be a tolerance of delay (e.g., an acceptable amount of delay time between wall clock time and the expiresAt of the timer).

In example embodiments, each of the Timer Consumers is a component that consumes timers near expiration and fire timer events at timer expiration to downstream destinations. Timer Consumers can own 1 or more shards. For this example, let's use a 1-to-1 mapping of Timer Consumer processes (also referred to herein as PODs) to shards. A consumer group of [tenant prefix][minute][shard] is created a configurable amount of seconds (e.g., 30 seconds) before the minute interval. Consuming from the queue ahead of expiration and pre-positioning in memory on a min heap helps ensure all timers are consumed and are not delayed. Optionally multiple consumers within the consumer group can uniquely consume the queue.

In example embodiments, throughput and latency are important considerations with respect to the timer service. In example embodiments, a high performance Remote Procedure Call (RPC) framework (e.g., gRPC) may be used for all internal and external APIs of the Timer Service. The timer endpoint destination in journeys may be a framework-based Event Filter component. The event may be put through a state machine (e.g., a Journey State Machine), transitioning the user out of the wait condition. While duplicate sends are rare, the state machine may use optimistic locking techniques on state changes. This conveniently mitigates any potential duplicate sending of a timer event from the timer service.

Systems and methods for implementing timers as a service are disclosed. A request to create a timer is received. The request corresponds to a wait state condition associated with an event in a data queue. The request specifies an endpoint for a payload associated with an expiration of the timer. The timer is created based on the wait state condition. The creation of the timer includes publishing information pertaining to the timer in a database. The timer is consumed. The consumption of the timer includes processing the information pertaining to the timer. Based on the expiration of the timer, the payload associated with the expiration of the timer is sent to the specified endpoint.

Systems and methods for implementing distributed in-memory timer queues are disclosed. A plurality of queues is distributed across a plurality of nodes. The plurality of queues includes a first queue. The first queue corresponds to current timer expirations for a tenant, time bucket, and shard. A sorted set includes minute references to unacknowledged timers for a tenant and shard. A plurality of processes is created. Each of the plurality of processes is configured to be a unique consumer of the distributed plurality of queues. A first consumer group and a second consumer group are created within each of the plurality of processes. The first consumer group corresponds to the first queue. The second consumer group corresponds to the sorted set. The plurality of processes is used to proportionally consume the first queue with the first consumer group and the sorted set with the second consumer group. In example embodiments, the unique consumer of the distributed plurality of queues is created right at consumption time, just ahead of the timers expiring.

FIG. 1A is a block diagram depicting an example technique for implementing timers using in-memory distributed queues (e.g., MemoryDB and/or Redis).

The timers on the data structure for the append-only log queues are in creation time order. When consumed they are added to a priority queue resident in POD memory.

In example embodiments, tenant prefixes are small internal identifiers stored with a tenant and generated on a server (e.g., as part of a CreateTenant( ) API call). Timer IDs are returned to a client when creating a timer. Timers are added to the queue that is keyed by [tenant prefix][minute][shard]. A unique timer ID is created by combining the queue key and messageId and is returned on the response-generated messageId to form a unique timerId. The unique messageIds (format: [millisecond]-[sequence]) are created when adding elements to the queue.

```
timerId = [tenant prefix] - [minute] - [shard] - [Redis messageId]
// prefix (2 bytes), separator (1 byte), minute (8 bytes),
separator (1 byte), shard (2 bytes), messageId (15-20 bytes)
```

Let's walk through the pseudo code steps for generating a unique timer ID when a timer is created.

```
minute = timer.expiresAt( )/60   // 27951425
shard = rand(0,totalShards)
messageId = XADD [minute]–[shard] * [sId] <sId>
   [payload] <payload>
   [expiresAt] expiresAt // returns 1526919030474-55
// return timerId to client (1-27951425-5-1526919030474-55)
return              fmt.Sprintf("%d-%d-%d-
%s",tenantPrefix,minute,shard,messageId)
```

Timers can be fetched or deleted by extracting the time bucket/shard, and separately the messageId from the timerId.

In another aspect, the shard can be generated by using a hash modulus of the timer metadata (any combination of payload and expiresAt). This allows for idempotent timer creation as duplicate creates will be added to the same queue and can be deduped at consumption time.

Figure 1B:
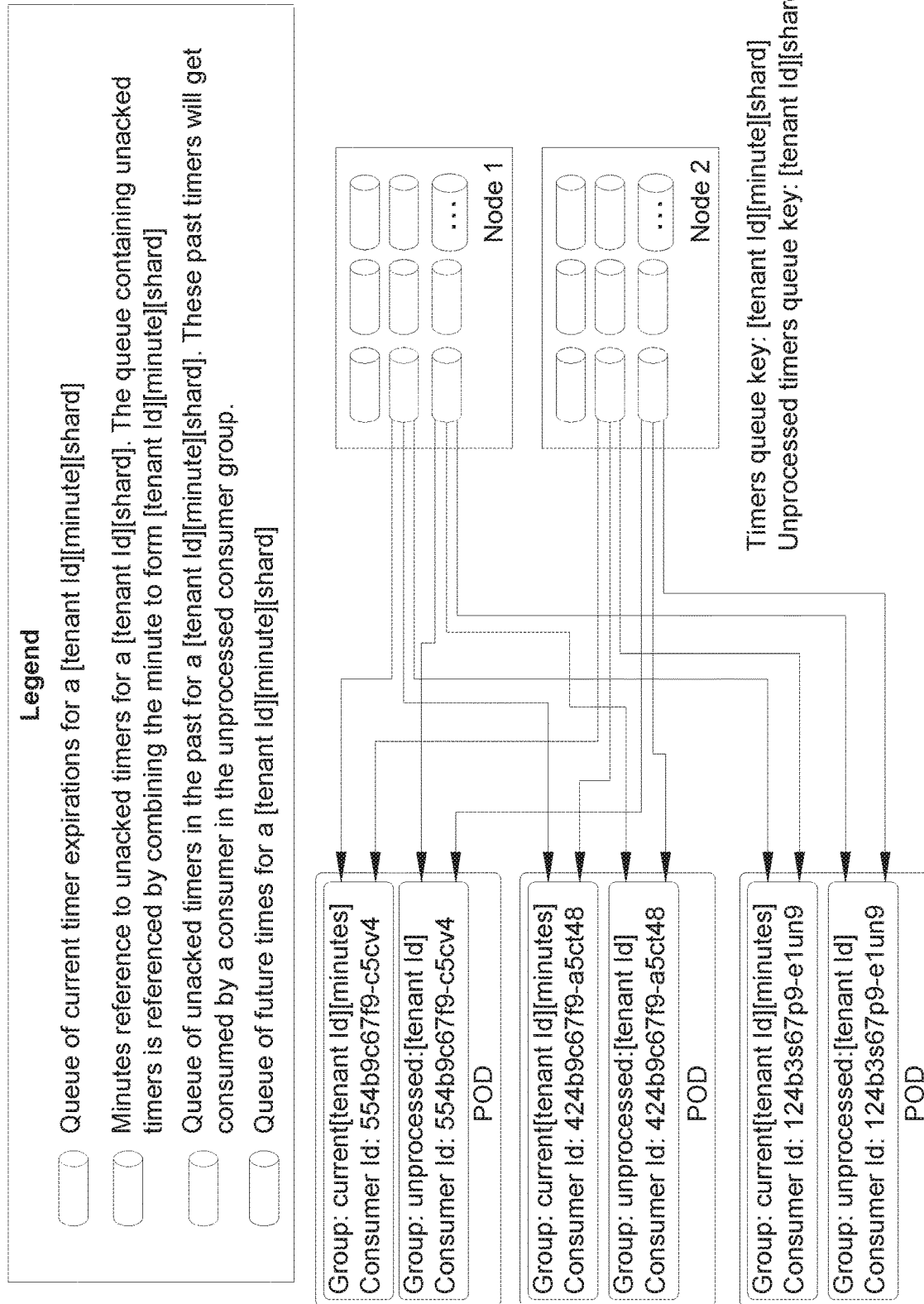
FIG. 1B is a block diagram depicting an example technique for implementing timers using distributed in-memory timer queues.

FIG. 1B is a block diagram depicting an example technique for implementing timers using distributed in-memory timer queues. In example embodiments, this technique does not require PODs. Advantages of this technique includes that the consumers can be scaled up/down based upon the aggregate distributed queue depth of future timers, as well as other advantages described herein.

In example embodiments, each POD is a unique consumer of all the distributed queues of the current sharded time bucket interval (e.g., minute) of timer expirations. Unique consumer IDs are generated by the POD name, or alternatively a uniquely generated ID. Consumer groups (named: [tenant Id][minute][shard] are created before the next time bucket interval is consumed.

Even in the case of multiple PODs outages, timers expiring in the current time bucket interval continue to get processed. This also allows for even read distribution across multiple PODs. In example embodiments, there is no hotspotting because the time bucket intervals are sharded (2 red shards in the example above), and each consumer (3 above) is proportionally consuming from each shared time bucket queue.

Figure 1C:
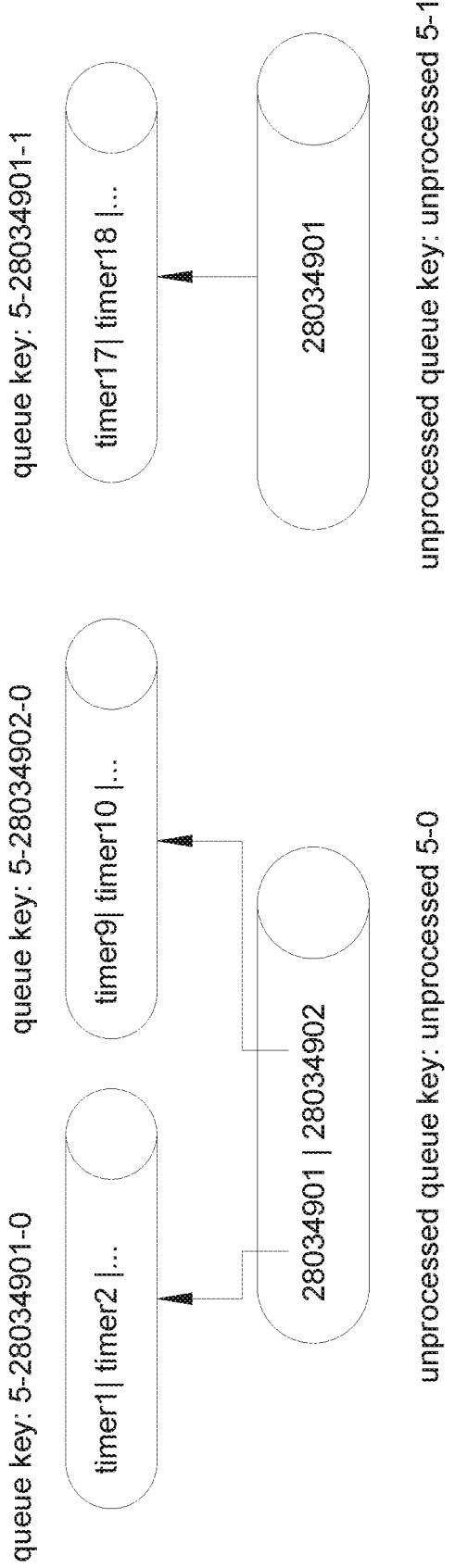
FIG. 1C is a block diagram depicting handling of failed timers.

FIG. 1C is a block diagram depicting handling of failed timers.

Multiple failure conditions can result in unacked/undeleted timers. For example, timers that expire and get fired to endpoint destinations could fail because the endpoint is unavailable. A POD could also crash before timers in-memory get sent to endpoint destinations.

To handle failure modes, whenever a timer is created the minute is added to a sorted set. Sorted sets are maintained per shard. These act as bookmarks to ensure all queues are fully processed.

There is a separate thread for each shard per tenant for processing the unprocessed minutes. Each of these threads check the sorted set for its allocation and peeks for the smallest minute and starts consuming timers for it. Timer queues and unprocessed queues sorted sets are only removed when all timers have been successfully processed and fired to the endpoint destination, or retries have been exhausted and proper alerting of undelivered timers is reported. At this time the thread moves on to the next minute. If there are no minutes left in the set, the thread waits for some time and checks again.

In the start up process, the threads for unprocessed timers can simply peek the smallest minute, no special processing is required. If there have been any gap minutes, processing the minutes on a sorted set in order will eventually drain the distributed queue holding the timers.

Timer queues and unprocessed queues are only removed when all timers have been successfully processed and fired to the endpoint destination, or retries have been exhausted and proper alerting of undelivered timers is reported.

Modes for Scaling Consumption Rates include horizontal POD scaling and multi-core/scaling threads.

For Horizontal POD Scaling mode, because all queues for a current time bucket interval are consumed by unique consumer IDs on all PODs, PODs can scale up/down based on the aggregate of the total futures timers over a time window. For example, a custom Horizontal POD Autoscaler can look at the total distributed queue depth of future time bucket intervals and build a scale up scheduling plan to accommodate large bursts of timer expirations. For the sake of cost economics, similarly a scale down plan based upon light totals of timer expirations can be built.

Multi-Core/Scaling Threads mode, consumers within a POD can determine by read rate thresholds to determine if additional unique consumers threads can be launched.

Thus, this technique provides the ability to schedule scale up/down across compute nodes or across process threads by looking at future distributed queue depth of timers expiring. It also provides even distribution of in-memory distributed queues representing timers, resulting in even read consumption across compute nodes. It also provides even distribution of in-memory distributed queues representing unprocessed timers, resulting in even read consumption when recovering from failures.

Figure 2:
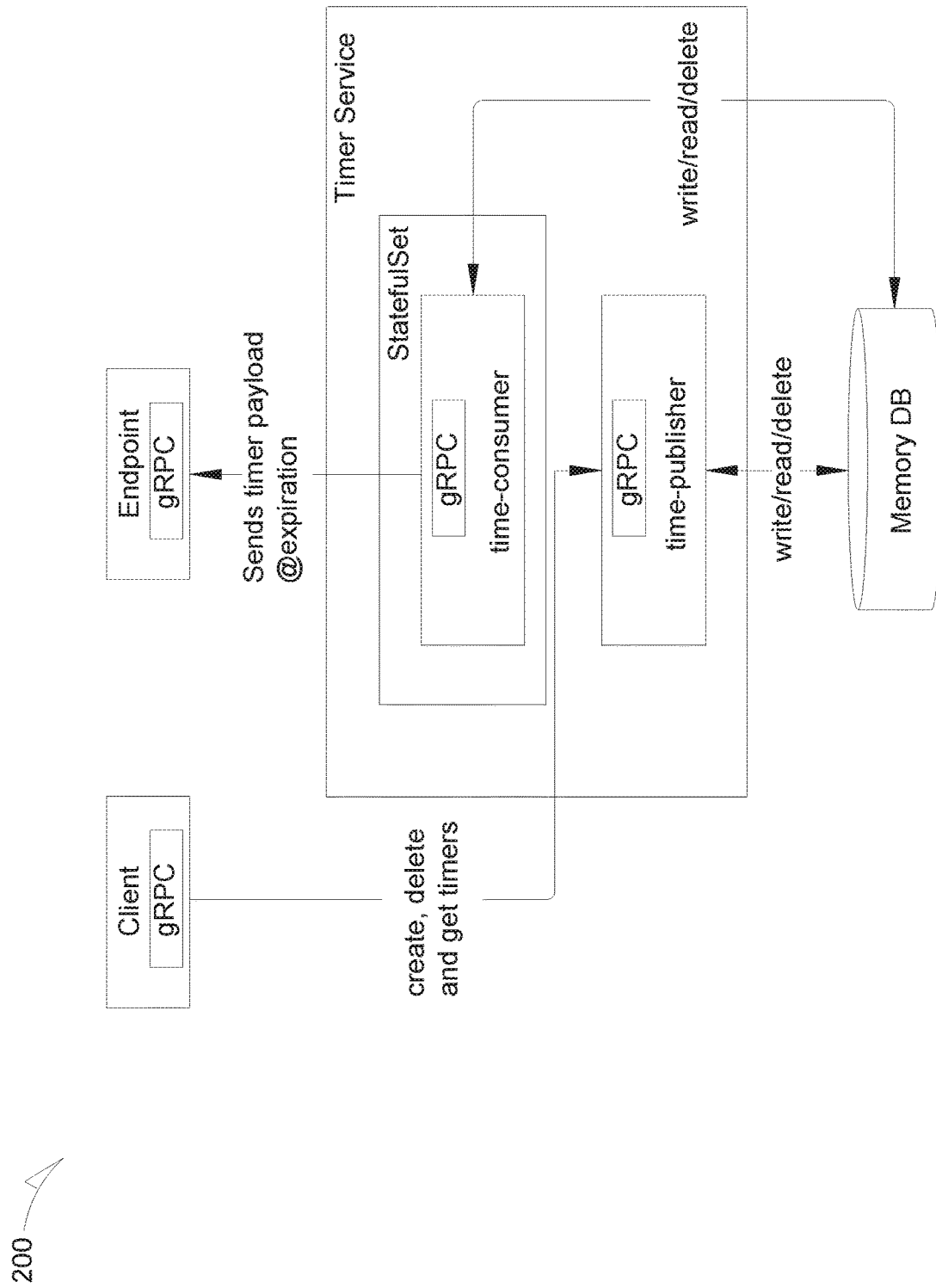
FIG. 2 is a block diagram showing an example component architecture of a timer service.

FIG. 2 is a block diagram showing an example component architecture 200 of the timer service 202. As shown, the example component architecture 200 includes a timer publisher 204 and a timer consumer 206, which both use an in-memory database 208. A client 210 can create a timer using the timer service 202. The timer service 202 can then write the payload from an expired timer to an endpoint 212.

Timer publisher 204 may run either as a single timer publisher or be run as a deployment with a number of replicas. In example embodiments, timer publisher 204 is an entry point for the client 210 to create, delete, and get timers. When the client 210 sends a request for the timer publisher 204 to create a timer, a unique timer ID is created and passed back to the client 210. In example embodiments, any timer with an expiration in the past is added to the time bucket schedule for the current time bucket; that is, past expirations are treated as "fire now" priority.

When the client 210 sends a request for the use of an existing to or a new expiration time for an existing timer, the timer publisher 204 updates the timer information. Any timer with an expiration in the past may be added to the timer schedule for the current time bucket interval. The timer publisher may send a number of instructions for a timer with an expiration time that is current or in the past to be read within the next time bucket interval and be given a priority.

The client 210 can use the unique timer ID provided by the timer publisher 204 to send a delete or a request for that timer to be used in a second instance. If the client 210 needs to create or delete a large number of timers, the timer publisher 204 can use either the unique ID or may accept an sID for the creation or deletion of a batch of timers. A single sID can be set for the batch of timers created by the timer publisher 204 to delete timers from the batch or the batch as a whole.

The timer consumer 206 may run either as a single timer consumer 106 or be deployed as a set of a number of replicas The responsibilities of the Timer Consumers are as follows:

A configurable amount of time (e.g., 30 seconds) ahead of the time bucket rollover: Add the time bucket to the unprocessed timer queue; For the range of shards owned, for all tenants create a consumer group "group-<shard>" with a single consumer "shard consumer-1" for each; For each "shard-consumer-1" in the respective "group-<shard>", begin consuming from the queue; Add timers to a map and priority queue with the priority being the expiresAt of the timer;

Send payloads to destinations when timers expire;

Ack timers successfully after responses from destination;

Housekeeping: Periodically check for pending messages and assign to self and process. If these exist, it means they were consumed but not acknowledged (likely a consumer crash); If the time bucket interval rolls over, add the time bucket to the unprocessed timers queue; Once the time bucket has passed and there are no more consumed messages, the queue or stream key can be deleted.

The consumer group functionality of the data structure for the data logs (e.g., Redis) allows for a number of consumers to concurrently consume unique messages. This is a powerful feature where the size of the queue can guide whether to run multiple consumers on the group. These could be dispatched to multiple threads for a higher local read rate.

Although the timer service aims for near real-time sends, being a certain (e.g., configurable amount of time) (e.g., minute(s)) late) may be tolerable. In example embodiments, the timer service never fires a timer early. In example embodiments, the timer service avoids sending too early and further minimize send time latency by using in-memory priority queues.

Timers on the queue (e.g., or stream) are in order of creation time. Out of order timers on the queue may be acceptable because the timers are sorted by expiresAt in a priority queue on the POD at consumption time.

When a timer is consumed from the queue it is added to a map with timer ID as the key. It is then added to the priority queue (min heap) with expiresAt used as the priority. Both data structures reference TimerItems as their value. TimerItems represent the metadata for a timer (sId, payload). Peeking for the next timer expiration is O(c), making it extremely efficient for periodic checks.

Pushing and popping may be O(log N). The map may be required so that deletes of timers can be looked up in O(c) and flagged as deleted. Particular sIDs can also be removed from TimerItems that represent batch timers with N SIDs.

Figure 3:
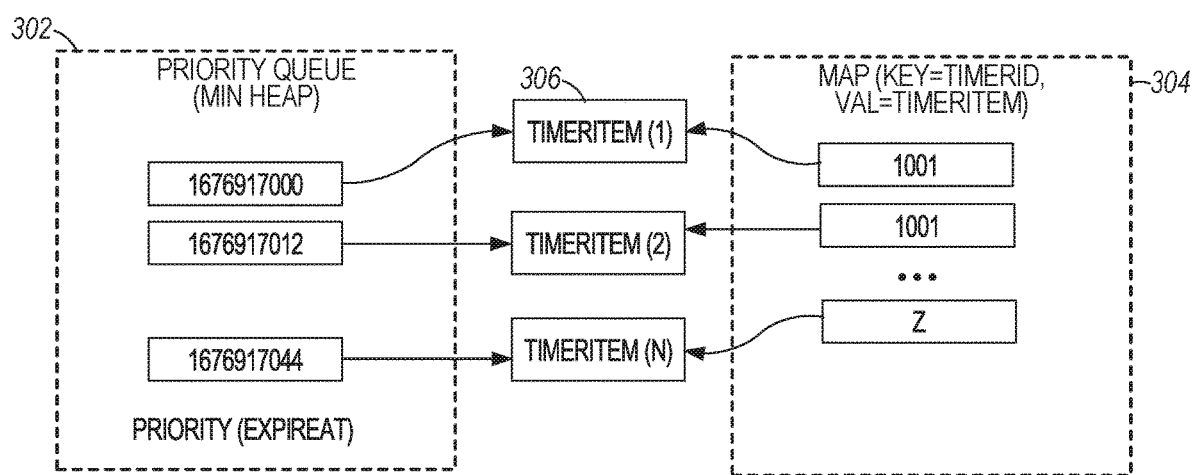
FIG. 3 is a block diagram depicting example data structures used by the Timer Consumer component.
Figure 4A:
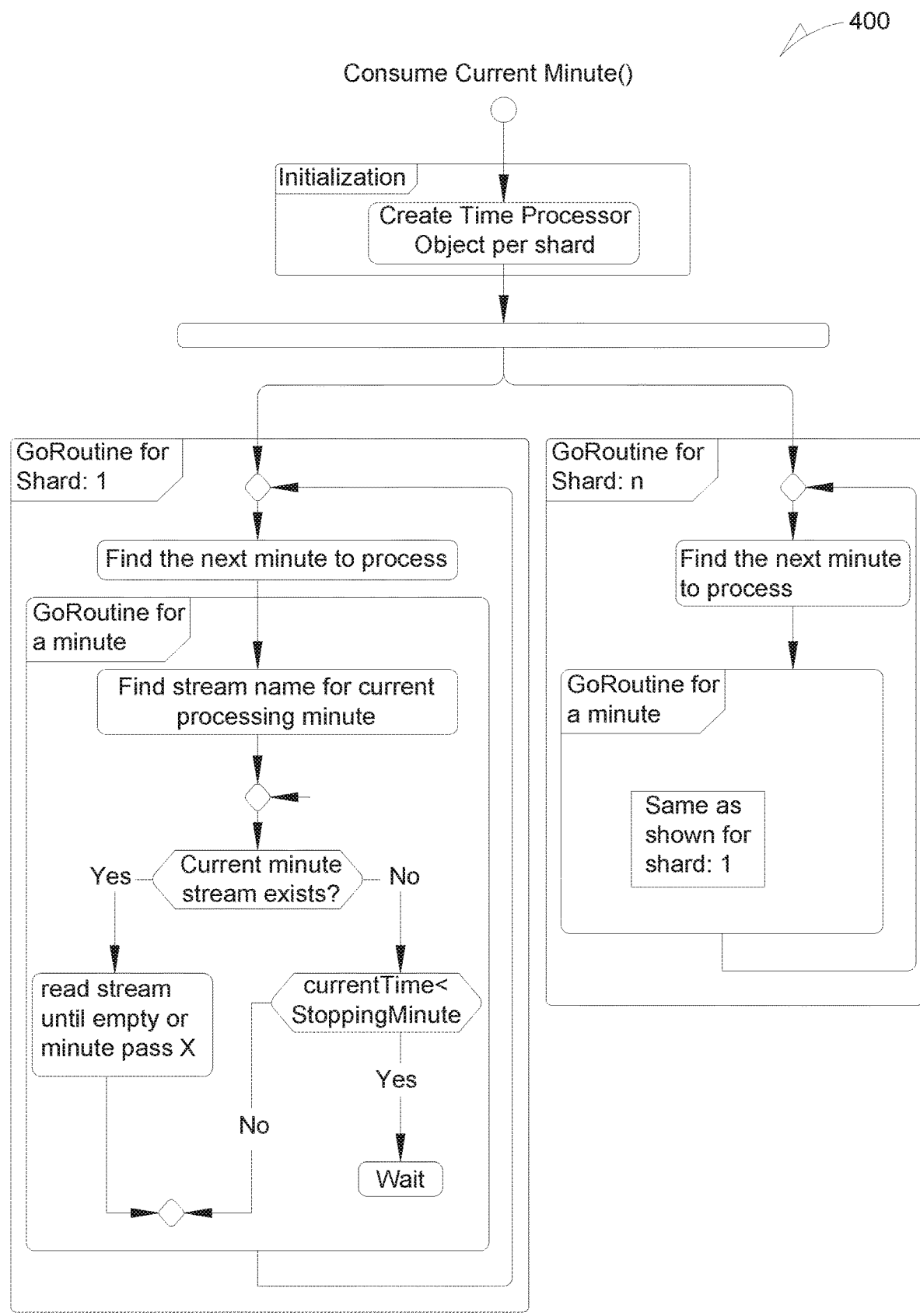
FIG. 4A is a flow diagram of an example time bucket (e.g., minute) consumption sequence.

FIG. 3 is a block diagram depicting example data structure used by the Timer Consumer component. Timer Consumers move forward processing the current time bucket. They are also responsible for processing any time bucket intervals that were missed as a result of a system outage or destination endpoint outage. The following summarizes the responsibilities for avoiding lost time buckets of processing:

FIG. 4A is a flow diagram of an example time bucket (e.g., minute) consumption sequence. The flow diagram shows an example process of consuming a new time bucket (e.g., minute) at a particular (e.g., predefined and/or configurable) interval (e.g., every 30 seconds). There is concurrent processing for every shard. The process looks up the stream for each shard in the next minute and shards load it in the in-memory heap. It processes all the timers for the minute until the stopping time (for example, the stopping time may be 30 seconds past the minute being processed). This happens at a particular (e.g., predefined and/or configurable) cadence (e.g., every 30 seconds).

In example embodiments, the process includes consuming timers from a specific time bucket, such as a minute, within a distributed in-memory timer queue system. The diagram shows the initialization of a thread or (e.g., GoRoutine) for each shard. In example embodiments, the Timer Consumer is responsible for identifying and consuming timers that are nearing expiration. The process begins with the thread for Shard 1 and is applicable to a thread for Shard n, indicating a scalable and parallel process across multiple shards. In example embodiments, the sequence involves checking if the time bucket stream for the current processing minute exists and, if so, reading the stream until it is empty or the minute has passed. If the current stream does not exist, the system waits before attempting to read again. This ensures that all timers that are due to expire within the current time bucket are processed in a timely and efficient manner, maintaining the integrity and performance of the timer service.

Figure 4B:
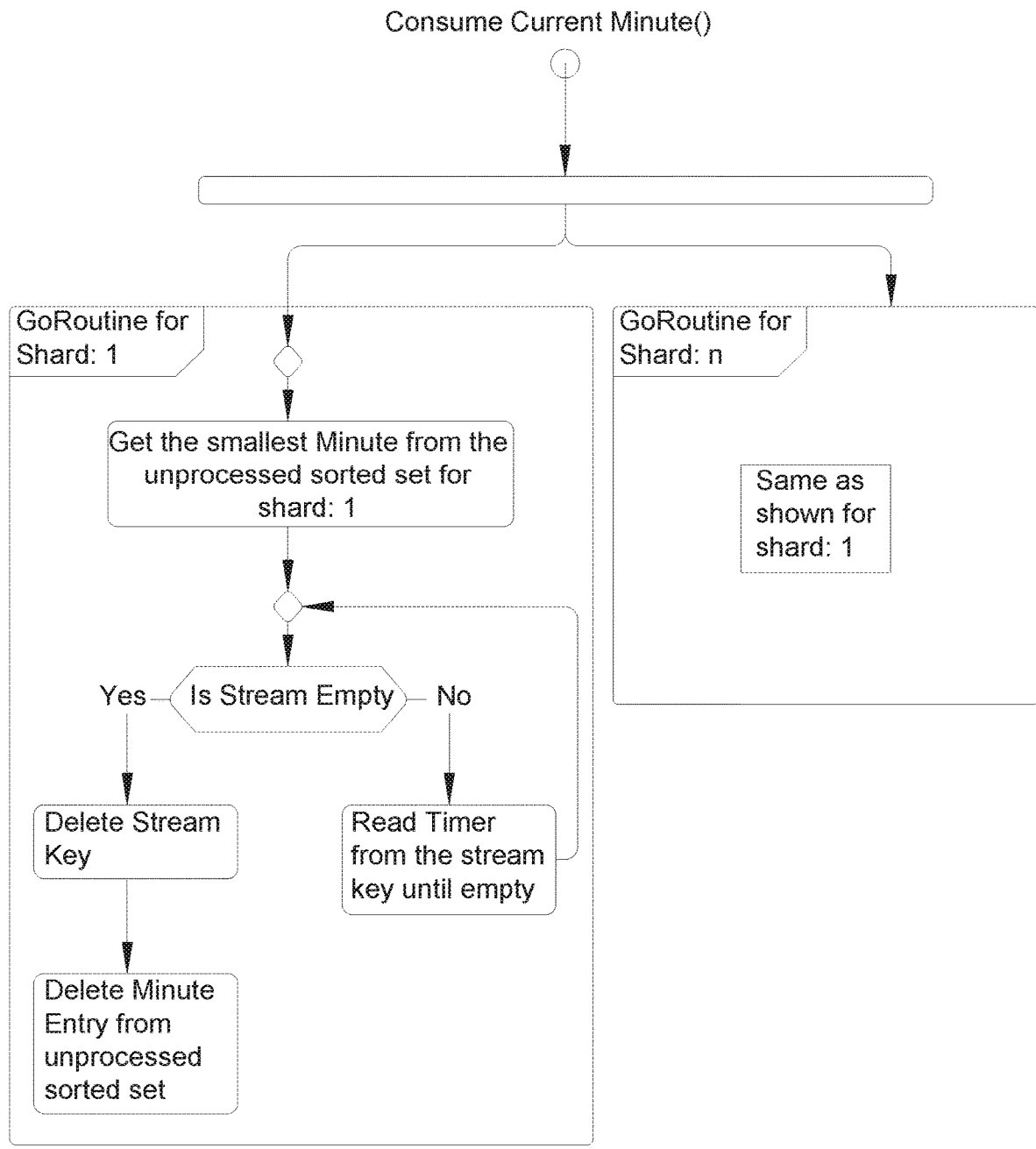
FIG. 4B is a flow diagram of an example unprocessed time bucket (e.g., minute) consumption sequence.

FIG. 4B is a flow diagram of an example unprocessed time bucket (e.g., minute) consumption sequence. The flow diagram shows an example process of consuming timers in the time buckets (e.g., minutes) in the past. Unprocessed sets are looked up to find the earliest time bucket. All shards in this time bucket are processed concurrently. The process starts consuming timers and adds them to the in-memory heap. Once all of the stream for the current time bucket being processed is empty for the current shard, the entry for it is removed from the sorted set and the stream keys are deleted.

In example embodiments, the process implements a procedure for handling unprocessed time buckets within the distributed in-memory timer queues. For example, the diagram details example steps taken by the Timer Consumer to manage timers that have not been acknowledged due to various failure conditions. The process involves retrieving the smallest time bucket from the unprocessed sorted set for a given shard and determining whether the corresponding stream is empty. If the stream is not empty, the Timer Consumer reads timers from the stream key until it is empty. Upon completion, the Time Bucket (e.g., Minute) Entry is deleted from the unprocessed sorted set, and the Stream Key is also removed. This ensures that all timers are either successfully processed or appropriately flagged for further action, thus providing a robust mechanism for handling timer expirations even in the face of system outages or other anomalies.

Figure 4C:
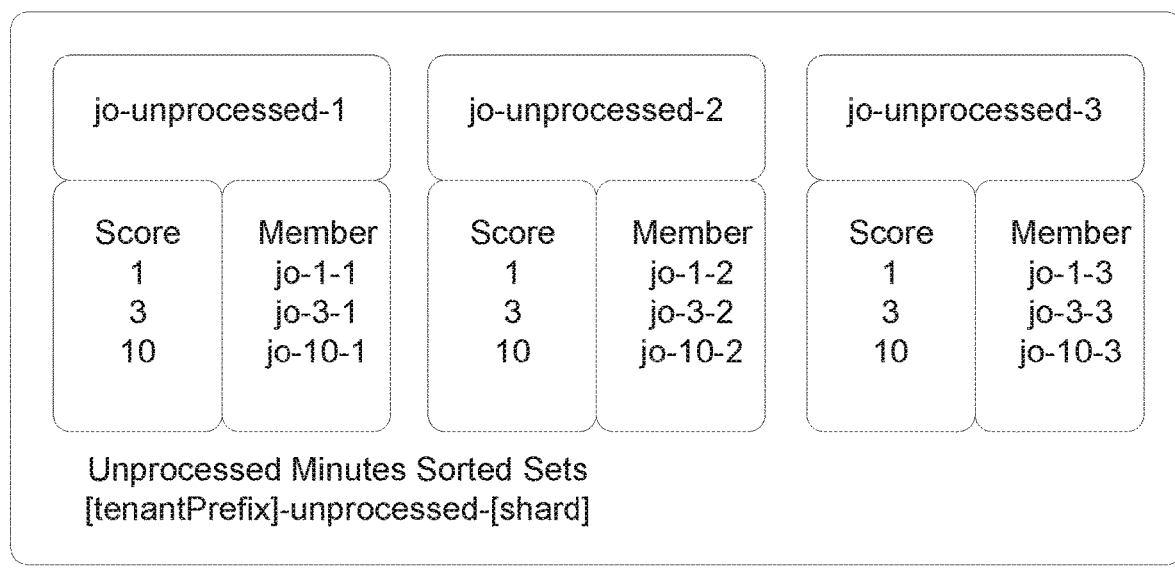
FIG. 4C is a block diagram depicting sorted sets of unprocessed time buckets (e.g., minutes).

FIG. 4C is a block diagram depicting sorted sets of unprocessed time buckets (e.g., minutes). The block diagram depicts sorted sets that are stored in the database. Each shard has its own dedicated sets. Every time a new timer is created, the timer is added to the time bucket (e.g., minute): shard stream and the expiring time bucket for the timer is added to the unprocessed set for the shard where the timer was added.

The block diagram provides a visual representation of example sorted sets used to manage unprocessed time buckets within the distributed in-memory timer queue system. The diagram illustrates an example structure of the sorted sets, which may be organized by tenant prefix and shard, and contain members that represent the minute intervals of unacknowledged timers. Each member within the sorted set may be associated with a score that facilitates the ordered retrieval of unprocessed minutes. This organization allows the Timer Consumer to efficiently identify and process timers that have not been previously acknowledged, ensuring that no timer expiration is missed and that the system can recover from failures by processing past timers in a systematic and ordered fashion.

While the various operations in these diagrams are presented and described sequentially, one of ordinary skill will appreciate that some or all of the operations may be executed in a different order, be combined, or omitted, or be executed in parallel. The example sequences depicted in FIGS. 4A, 4B, and/or 4C can be performed in part or in whole by the architecture of the system 200.

FIG. 5 are tables showing system-level metrics 502 and application-level metrics 504 available in time series form with appropriate percentiles.

Figure 6:
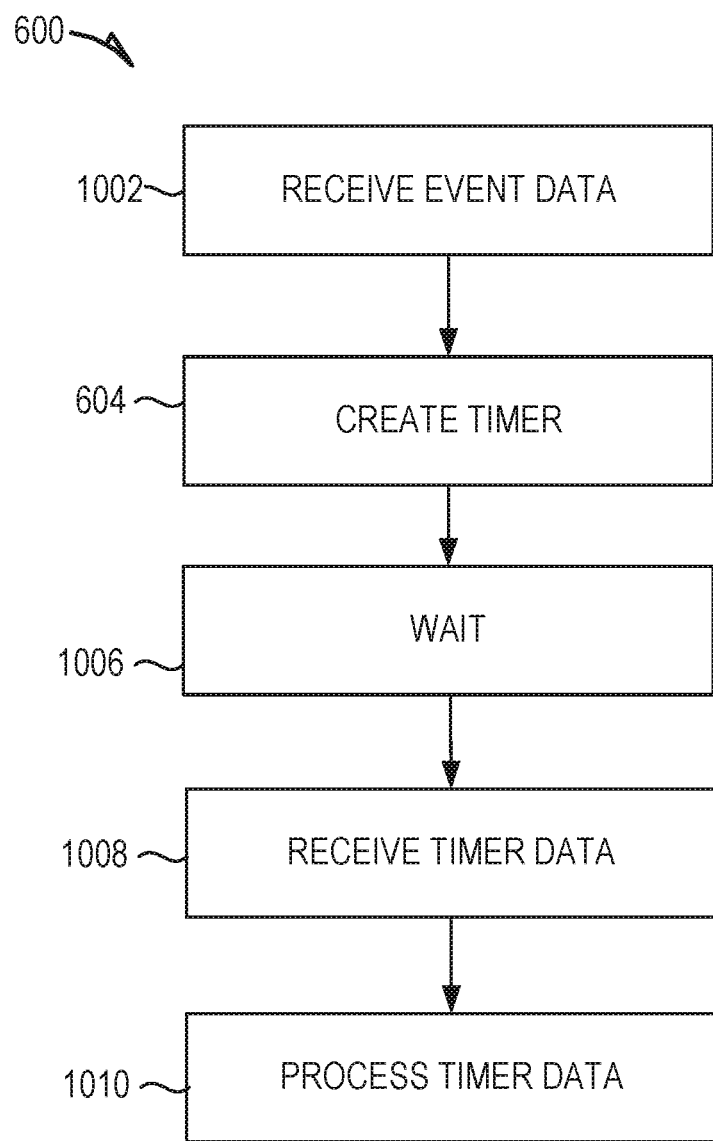
FIG. 6 is a flow diagram of an example use case.

FIG. 6 is a flow diagram of an example use case 600. While the various operations in this diagram are presented and described sequentially, one of ordinary skill will appreciate that some or all of the operations may be executed in a different order, be combined, or omitted, or be executed in parallel. The example use case 600 depicted in FIG. 6 can be performed in part or in whole by the client 210.

The client 210 may set parameters (e.g., as a journey definition) that describes the states/steps and state transitions an end user may experience when interacting with the client 210. The journey definition may have a step that includes the instructions for when a wait condition is triggered by the end user. The wait condition would be used as an interface to generate a timer. The end user transitioning from one state or step or a second state or step would send, as a data queue or stream to the client, event data, which has information about the current state of the journey that the end user is currently in. This event data can be received 602 (e.g., over an application programming interface (API)). This event data would be used to create a timer 604. The timer would define the wait condition 606 at this step of the journey. The timer service 202 would use the timer publisher 204 to create a timer that is stored in an in-memory queue that represents the time bucket of the expiresAt of the timer. When the wait condition is satisfied the data associated with the timer is received at step 608. At operation 610, the client process the timer data (e.g., by transitioning to the next step or next state as described by the journey definition).

For example, an end user may be interacting with a client website and starts to make a purchase by placing an item in a shopping cart and subsequently either forgets or abandons the cart. A campaign administrator may have set up a journey definition that upon the end user placing an item in the shopping cart, a set amount of time must be waited before sending a notification to the end user. The notification could be any series of notifications methods, such as an email or a SMS message or any other method of communication from the client. The wait condition could be set to be within a time bucket interval of the end user's triggering action, or days or years in the future. In the example of an abandoned shopping cart, the user might be reminded within the hour that the item is in low stock. Or in the case where the purchase was completed, a reminder for restock notification may be set in a couple of months. Both timers can be created by the timer publisher 104 at the time the user interacts with the timer, and the timer can then check to see if the timer trigger conditions are satisfied at the time the timer is to be executed in the future. At the time the timer is set to be executed, the timer consumer 206 consumes the timer from the distributed queue, writes the information to the memory distributed queue storage 208, and sends the data payload associated with the information about the timer to the endpoint 212.

Figure 7:
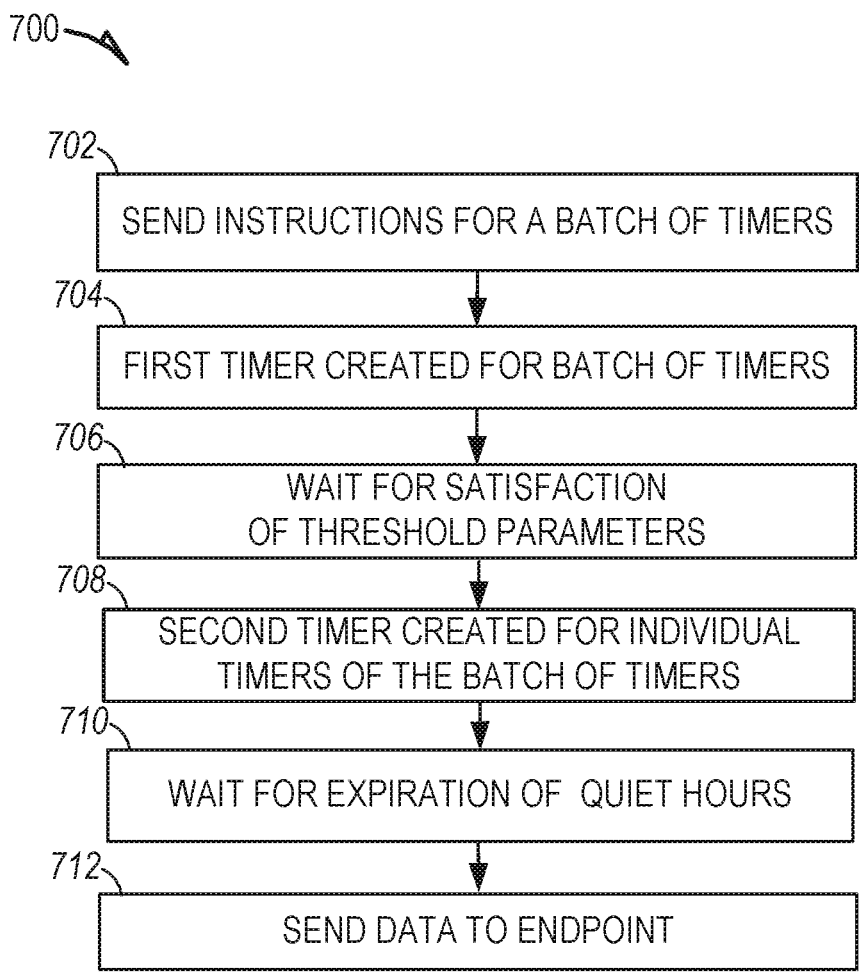
FIG. 7 is a flow diagram of another example use case according to some embodiments.

FIG. 7 is a flow diagram of another example use case 700 according to some embodiments. While the various operations in this diagram are presented and described sequentially, one of ordinary skill will appreciate that some or all of the operations may be executed in a different order, be combined, or omitted, or be executed in parallel. The example use case 700 depicted in FIG. 7 can be performed in part or in whole by the architecture of the system 200.

The client 210 may want to send a large batch of notifications or emails to a large audience within a specified time period. At step 702, the client 210 can send at least one parameter for the creation of a batch of timers associated with a single send notification. For example, a user might want to send an email to all people who have interacted with their website or application within the past 2 days. At step 704, the timer publisher 204 may create a batch of timers, which includes setting the threshold wait conditions and may also include a set a time period for creating the audience for the batch of timers. These batches of timers will be sharded across multiple distributed queues, each representing a portion of the time bucket representing the expiresAt of the timers. At step 706, the system 200 waits for the wait condition to be satisfied before the timers are consumed by the timer consumer 206. At step 708, the first timer wait condition is satisfied and a second timer for each member in the audience is created with a wait condition set to make sure that the notification sends during an end user's set quiet hours. In another aspect, the quiet hours are set internally by a system that predicts a users quiet hours. Quiet hours are set by individual users to designate set time periods in which the user will not receive notifications. Quiet hours can be set to mute all notifications for phone calls, text messages, and/or emails. The client 210 sets that the notification should be sent to the end user during active hours or that the notification or email should not be sent during set quiet hours. At step 710, the second wait condition is observed. At step 712, after the individual timer is consumed by the timer consumer 206 at the time the timer was expired, the data associated with that timer is sent to an endpoint 712. In large batches of times, the expiration and sending of data of specified endpoints 712 may happen for a large number of individual timers of the batch of timers created.

Figure 8:
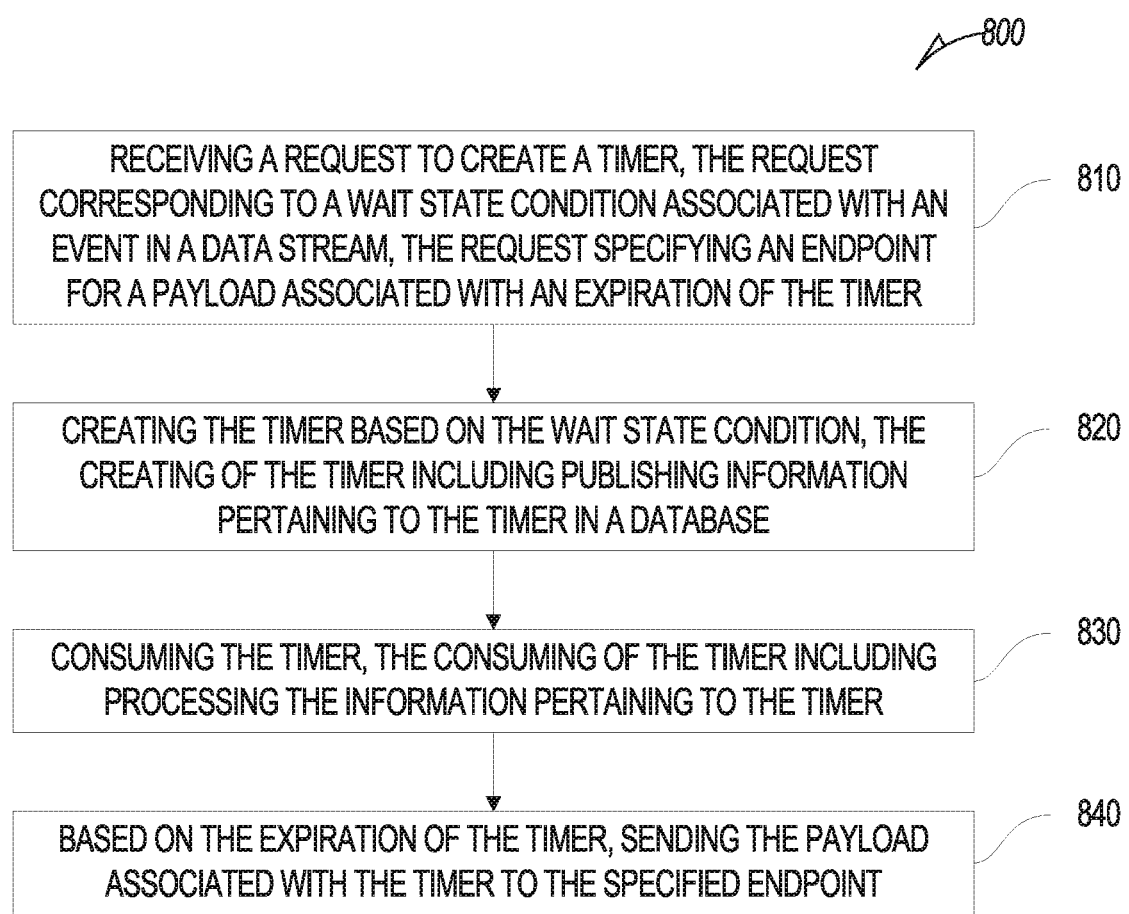
FIG. 8 is a flowchart of a method according to some embodiments.

FIG. 8 is a flowchart of a method 800 according to some embodiments. While the various operations in this flowchart are presented and described sequentially, one of ordinary skill will appreciate that some or all of the operations may be executed in a different order, be combined or omitted, or be executed in parallel. The method 800 depicted in FIG. 8 can be performed in part or in whole by the architecture of the system 200.

At step 810, the timer service 202 receives from a client 210 a request to create a timer, the request corresponding to a wait state condition associated with an event in a data queue or stream, the request specifying an endpoint 212 for a payload associated with an expiration of the timer.

At step 820, the timer service 202 uses the timer publisher 204 to create the timer based on the wait state condition, the creating of the timer including publishing information pertaining to the timer in an in-memory database. The timer publisher 204 creates a unique timer ID including information pertaining to the timer within the memory distributed queue storage 208 about the timer, and that timer ID is passed back to the client 210. To alleviate load, timers that do not expire within 24 hours can be written to a distributed queue. The queue can be periodically consumed and written into the in-memory distributed queues 208. The use of a partitioning scheme such as utilizing time buckets may be used.

At step 830, the timer consumer 206 consumes the timer at the time of the timer expiration. Or, In another aspect. The timers are pre-positioned in the min-heap moments before the timers expire. The consumption of the timer includes processing the information pertaining to the timer by the timer consumer 206. The memory distributed queue storage 208, which stores information related to the timer, stores the information that is consumed by the timer consumer 206 in insertion order. The order of the timers is determined for the timers by reading the expiresAt time of the timer in the timer ID. Timers are grouped and ordered in a priority queue with the priority being a time. For example, timers may be grouped by the expiration second, where multiple timers share the same second of expiration. Each distributed queue that hold timers which are about to expire are consumed by each unique Timer Consumer. Each timer is uniquely delivered to only one Timer Consumer. In another aspect, the distributed queues can be assigned to Timer Consumers by an algorithm or static configuration.

In the case of a failed write to the memory distributed queue storage 108, a new primary memory distributed queue storage 208 can be set to take over. Writes to the memory distributed queue storage 208 may be briefly restricted. A retry threshold can be set for a new shard to be chosen with a unique timer ID.

At step 840, the timer consumer 206 sends the payload associated with the timer to a specified endpoint 212 based on the expiration of the timer. The sending of the payload is performed according to the order that was previously determined by the timer consumer 206 based on the information in the timer ID. The order is maintained even after the expiration of the timer. In the case of graceful shutdown, or when a Timer Consumer is fully operational, duplicate sends are eliminated as the read and write consistency of both the consuming timers and the acknowledged timers are tracked. Actions such as retrieving a timer or retrieving statistics for a timer are set to read only and can occur from replica nodes.

If a timer fails to send, the timer can be retried with exponential backoffs. With the backoff being able to reschedule the timer for a later time. A specified thresholds may be set on the number of retries or retry time. If that threshold is exhausted, the timers can be added back to the priority queue with a modified expiration priority. Failed messages are not acknowledged as a fired or consumed timer by the timer consumer 206. In the event that the system crashes, upon startup, the timer consumer 206 will make the messages that acknowledge the failure of the timers to be sent fired available on the distributed queue. On startup of the timer consumer 206, the timer consumer 206 checks a pending list of ownership for the timers.

The timer consumer 206 advances forward consuming and sending timers for the next time bucket intervals. The unprocessed timers in the memory distributed queue storage 208 are remembered as pending messages, so retry attempts may continue. They are remembered by the memory distributed queue storage 208 as pending messages.

The unprocessed timer in the memory distributed queue storage 208 are owned by each timer consumer 206. The timer consumer 206 keeps track of the time bucket intervals with pending timers in their own distributed queue storage 208. These messages are only removed when there are no more pending timers for the given timer ID with the distributed queue storage 208.

For any given shard, after processing the current time bucket interval and all messages have been consumed by the timer consumer 206, the queue or stream key can be deleted to free up memory in the memory distributed queue storage 208.

Figure 9:
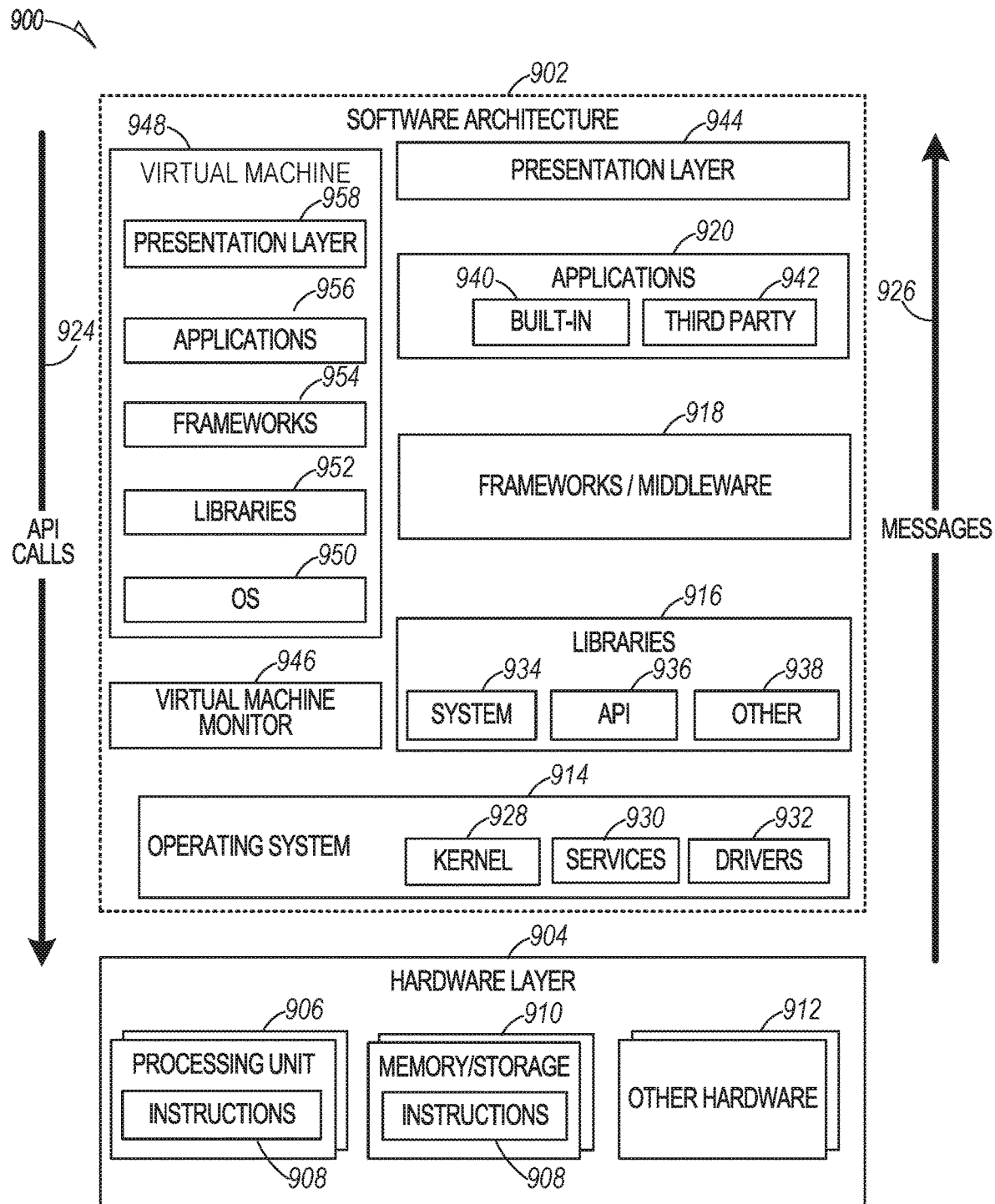
FIG. 9 is a block diagram illustrating an example of a software architecture 900 that may be installed on a machine, according to some example embodiments.

FIG. 9 is a block diagram illustrating an example of a software architecture 900 that may be installed on a machine, according to some example embodiments. FIG. 9 is merely a non-limiting example of software architecture, and it will be appreciated that many other architectures may be implemented to facilitate the functionality described herein. The software architecture 902 may be executing on hardware such as a machine 1000 of FIG. 10 that includes, among other things, processors 1002, main memory 1004, and alphanumeric input/output (I/O) components 1012. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 900.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 913, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special-purpose operating systems may not provide a frameworks/middleware 913 layer, while others may provide such a layer. Other software architectures may include additional or different layers.

The operating system 914 may manage hardware resources and provide common services. The operating system 914 may include, for example, a kernel 923, services 930, and drivers 932. The kernel 923 may act as an abstraction layer between the hardware and the other software layers. For example, the kernel 923 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 923, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 933 to provide many other APIs to the applications 920 and other software components/modules.

The frameworks 913 (also sometimes referred to as middleware) may provide a higher-level common infrastructure that may be utilized by the applications 920 or other software components/modules. For example, the frameworks 913 may provide various graphical user interface functions, high-level resource management, high-level location services, and so forth. The frameworks 913 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a home application, a contacts application, a browser application, a book reader application, a location application, a media application, a messaging application, or a game application.

The third-party applications 942 may include any of the built-in applications 940, as well as a broad assortment of other applications. In a specific example, the third-party applications 942 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 942 may invoke the API calls 924 provided by the mobile operating system such as the operating system 914 to facilitate functionality described herein.

The applications 920 may utilize built-in operating system functions (e.g., kernel 923, services 930, or drivers 932), libraries (e.g., system libraries 934, API libraries 936, and other libraries 933), or frameworks/middleware 913 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 943. The virtual machine 943 creates a software environment where applications/modules can execute as if they were executing on a hardware machine (e.g., machine 1000 of FIG. 10). The virtual machine 943 is hosted by a host operating system (e.g., the operating system 914) and typically, although not always, has a virtual machine monitor 946, which manages the operation of the virtual machine 943 as well as the interface with the host operating system (e.g., the operating system 914). A software architecture executes within the virtual machine 943, such as an operating system 950, libraries 952, frameworks/middleware 954, applications 956, or a presentation layer 953. These layers of software architecture executing within the virtual machine 943 can be the same as corresponding layers previously described or may be different.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an Application or Application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an Application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprise a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

Example Machine Architecture and Machine-Readable Medium

Figure 10:
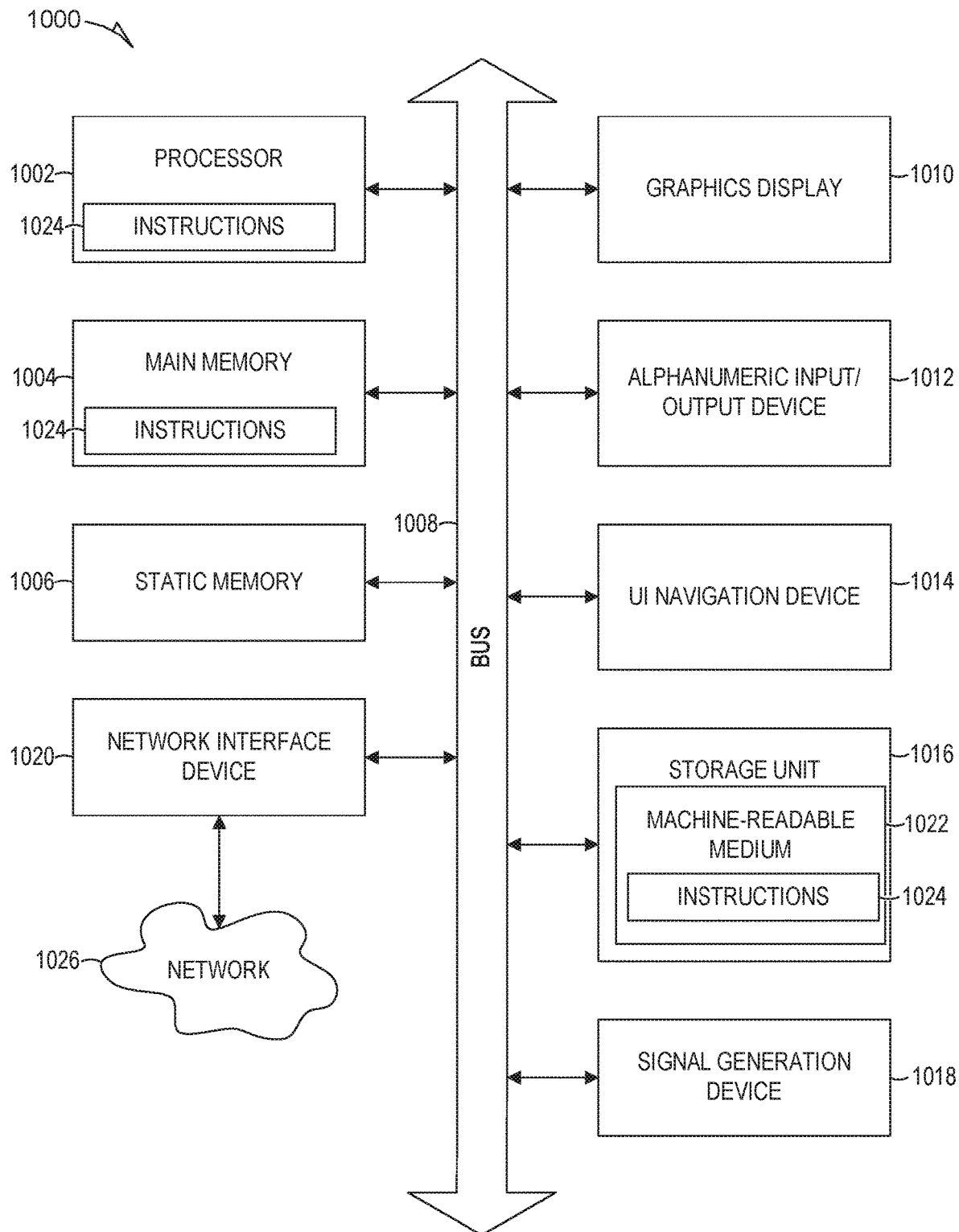
FIG. 10 is a block diagram of an example computer system on which methodologies and operations described herein may be executed, in accordance with an example embodiment In the drawings, which are not necessarily drawn to scale, like numerals may describe similar components in different views. Like numerals having different letter suffixes may represent different instances of similar components. The drawings generally illustrate, by way of example, but not by way of limitation, various embodiments discussed in the present document.

FIG. 10 is a block diagram of an example computer system 700 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a graphics display 1010 (e.g., a liquid crystal display (LCD) or a cathode ray tube (CRT)). The computer system 1000 also includes an alphanumeric input device 1014 (e.g., a keyboard or a touch-sensitive display screen), a user interface (UI) navigation device 1014 (e.g., a mouse), a storage unit 1016, a signal generation device 1018 (e.g., a speaker) and a network interface device 1020.

Machine-Readable Medium

The storage unit 1016 includes a machine-readable medium 1022 on which is stored one or more sets of instructions 1024 including data structures (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions (e.g., instructions 1024) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any lists that follow are examples and not meant to be limited to the listed items.

A service, function, or resource is not limited to a single service, function, or resource; usage of these terms may refer to a grouping of related services, functions, or resources, which may be distributed or aggregated. The use of "memory," "database," "information base," "data store," "tables," "hardware," and the like may be used herein to refer to system component or components into which information may be entered or otherwise recorded. The terms such as "data" or "information," along with similar terms, may be replaced by other terminologies referring to a group of bits, and may be used interchangeably. The terms "packet" or "frame" shall be understood to mean a group of bits. The term "frame" shall not be interpreted as limiting embodiments of the present inventive subject matter to Layer 2 networks, and the term "packet" shall not be interpreted as limiting embodiments of the present inventive subject matter to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples provided herein are provided by way of illustration and under specific conditions using a specific embodiment or embodiments; accordingly, neither these examples nor their implementations shall be used to limit the scope of the disclosure of the current patent document.

It shall also be noted that although embodiments described herein may be within the context of client-side enrichment and transform, aspects of the present disclosure are not so limited. Accordingly, the aspects of the present disclosure may be applied or adapted for use in other contexts.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims and the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various embodiments of the present disclosure. In general, structures and functionality presented as separate resources in the example, configurations may be implemented as a combined structure or resource.

Similarly, structures and functionality presented as a single resource may be implemented as separate resources. These and other variations, modifications, additions, and improvements fall within a scope of embodiments of the present disclosure as represented by the appended claims. Accordingly, the specification and drawings are to be regarded in an illustrative rather than a restrictive sense.

The invention claimed is:

1. A method comprising:
distributing a plurality of queues across a plurality of nodes, the plurality of queues including a first queue, the first queue corresponding to timer expirations for a tenant, time bucket, and shard, wherein a sorted set includes references to unacknowledged timers for a tenant and shard;
creating a plurality of processes, each of the plurality of processes configured to be a unique consumer of the distributed plurality of queues,
creating a first consumer group and a second consumer group within each of the plurality of processes, the first consumer group corresponding to the first queue, the second consumer group corresponding to the sorted set; and
using the plurality of processes to consume the first queue with the first consumer group and the second queue with the second consumer group.

2. The method of claim 1, wherein an additional sorted set includes unacknowledged timers in the past for a tenant, minute, and shard.

3. The method of claim 2, the operations further comprising using the plurality of processes to proportionally consume the additional sorted set with the second consumer group.

4. The method of claim 1, the plurality of queues further including an additional queue, the additional queue corresponding to future timers for a tenant, time bucket, and shard.

5. The method of claim 1, wherein the consuming of the timers from the additional queue includes placing them on an in-memory minheap.

6. The method of claim 1, the operations further comprising removing the sorted set when all unacknowledged timers have been processed.

7. The method of claim 1, wherein the consuming of the first queue and the sorted set includes firing the timer to an endpoint destination.

8. A system comprising:
one or more computer processors; and
one or more memories;
a set of instructions stored in the one or more computer memories, the sect of instructions causing the one or more computer processors to perform operations, the operations comprising:
distributing a plurality of queues across a plurality of nodes, the plurality of queues including a first queue, the first queue corresponding to timer expirations for a tenant, time bucket, and shard, wherein a sorted set includes references to unacknowledged timers for a tenant and shard;
creating a plurality of processes, each of the plurality of processes configured to be a unique consumer of the distributed plurality of queues;
creating a first consumer group and a second consumer group within each of the plurality of processes, the first consumer group corresponding to the first queue, the second consumer group corresponding to the sorted set; and
using the plurality of processes to proportionally consume the first queue with the first consumer group and the second queue with the second consumer group.

9. The system of claim 8, wherein an additional sorted set includes unacknowledged timers in the past for a tenant, time bucket, and shard.

10. The system of claim 9, the operations further comprising using the plurality of processes to proportionally consume the additional sorted set with the second consumer group.

11. The system of claim 8, the plurality of queues further including an additional queue, the additional queue corresponding to future timers for a tenant, time bucket, and shard.

12. The system of claim 8, wherein the consuming of the timers from the sorted set includes placing them on an in-memory minheap.

13. The system of claim 8, the operations further comprising removing the sorted set when all unacknowledged timers have been processed.

14. The system of claim 8, wherein the consuming of the first queue and the sorted set includes firing the timer to an endpoint destination.

15. A non-transitory computer-readable storage medium storing a set of instructions that, when executed by one or more computer processors, cause the one or more computer processors to perform operations, the operations comprising:
distributing a plurality of queues across a plurality of nodes, the plurality of queues including a first queue, the first queue corresponding to current timer expirations for a tenant, time bucket, and shard, wherein a sorted set includes minute references to unacknowledged timers for a tenant and shard;
creating a plurality of processes, each of the plurality of processes configured to be a unique consumer of the distributed plurality of queues;
creating a first consumer group and a second consumer group within each of the plurality of processes, the first consumer group corresponding to the first queue, the second consumer group corresponding to the sorted set; and
using the plurality of processes to proportionally consume the first queue with the first consumer group and the second queue with the second consumer group.

16. The non-transitory computer-readable storage medium of claim 15, wherein an additional sorted set includes unacknowledged timers in the past for a tenant, time bucket, and shard.

17. The non-transitory computer-readable storage medium of claim 16, the operations further comprising using the plurality of processes to proportionally consume the additional sorted set with the second consumer group.

18. The non-transitory computer-readable storage medium of claim 15, the plurality of queues further including an additional queue, the additional queue corresponding to future timers for a tenant, time bucket, and shard.

19. The non-transitory computer-readable storage medium of claim 15, wherein the consuming of the timers from the sorted set includes placing them on an in-memory minheap.

20. The non-transitory computer-readable storage medium of claim 15, the operations further comprising removing the sorted set when all unacknowledged timers have been processed.

\* \* \* \* \*